United States Patent [19]
Norrell et al.

[11] Patent Number: 6,115,395
[45] Date of Patent: Sep. 5, 2000

[54] METHOD OF DETECTING NETWORK IMPAIRMENTS FOR HIGH SPEED DATA COMMUNICATION OVER CONVENTIONAL SUBSCRIBER LINES

[75] Inventors: Andrew L. Norrell, Nevada City, Calif.; Mark A. Waldron, Gurnee; Vladimir G. Parizhsky, Chicago, both of Ill.; Carl H. Alelyunas; Scott A. Lery, both of Nevada City, Calif.

[73] Assignee: 3COM Corporation, Santa Clara, Calif.

[21] Appl. No.: 08/944,462

[22] Filed: Oct. 6, 1997

Related U.S. Application Data

[60] Provisional application No. 60/030,843, Nov. 15, 1996.

[51] Int. Cl.$^7$ ...................................................... H04J 3/12
[52] U.S. Cl. .......................... 370/523; 370/522; 370/250; 370/458
[58] Field of Search ................................ 370/458, 466, 370/252, 474, 522, 523, 250; 375/254, 346, 347, 231, 230, 232, 235, 229, 227, 348, 242

[56] References Cited

U.S. PATENT DOCUMENTS

| | | | |
|---|---|---|---|
| 4,835,790 | 5/1989 | Yoshida et al. | 375/227 |
| 5,343,461 | 8/1994 | Barton et al. | 370/466 |
| 5,598,431 | 1/1997 | Lobel | 375/227 |
| 5,701,333 | 12/1997 | Okanoue et al. | 375/348 |
| 5,801,695 | 9/1998 | Townshend | 375/340 |
| 5,809,075 | 9/1998 | Townshend | 375/254 |
| 5,835,538 | 11/1998 | Townshend | 375/295 |
| 5,859,872 | 1/1999 | Townshend | 375/242 |

OTHER PUBLICATIONS

Humblet, Pierre A. and Troulis, Markos G.; *The Information Driveway*; IEEE Communications Magazine, Dec. 1996 pp. 64–68.

*Primary Examiner*—Michael Horabik
*Assistant Examiner*—Prenell Jones
*Attorney, Agent, or Firm*—McDonnell Boehnen Hulbert & Berghoff

[57] ABSTRACT

A method of detecting the presence of signal impairments that introduce distortion in one or more time slots of a communication link by comparing a received training sequence of signal points with hypothetical received signal points, where the hypothetical points are predistorted versions of the training sequence, and are based on the known, predetermined training sequence of signal points. A detection matrix is formed where one dimension of the matrix corresponds to a time slot within a frame, preferably six time slots to a frame, and the other dimension corresponds to a particular impairment, or combination of impairments. The individual signal impairments are generally one or more of the following: robbed bit signaling where the robbed bit is replaced with a logic '0'; robbed bit signaling where the robbed bit is replaced with a logic '1'; robbed bit signaling where the robbed bit is replaced with a logic '1/2'; 3 dB digital attenuator; 6 dB digital attenuator. The hypotheses are based on individual impairments and combinations/permutations of these impairments. The minimum value of each column (corresponding to a time slot within the frame) of the detection matrix indicates the type of impairment in that time slot.

10 Claims, 4 Drawing Sheets

METHOD OF DETECTING NETWORK IMPAIRMENTS FOR HIGH SPEED DATA COMMUNICATION OVER CONVENTIONAL SUBSCRIBER LINES

RELATED APPLICATION

This application claims the benefit under 35 U.S.C. §119 (e) of U.S. Provisional Patent Application Serial Number 60/030,843, filed Nov. 15, 1996, entitled "Efficient Data Transmission Over Digital Telephone Networks using Multiple Modulus Conversion" for all common subject matter disclosed therein.

BACKGROUND OF THE INVENTION

The present invention is a method and device for detecting the presence of Robbed-Bit-Signaling (RBS) and/or a Network Digital Attenuater (NDA) on a channel between a communications server and client, a method and device for determining the phase(s) of the RBS process relative to the frame index of the Server Data Encoder. These techniques can be used to help minimize the impact of RBS/NDA on the data rate over such channels.

The techniques described herein relate to improvements in data communications on Digital Telephone Networks (DTN's). Presently, typical modems used to communicate over the public telephone system represent binary data by an analog waveform that is modulated in response to the binary data. As an example, one such standard for modem communications is detailed in the International Telecommunication Union, Telecommunication Standardization Sector ("ITU-T") Recommendation V.34 (1994). The waveform is in turn analyzed at a receiving modem to recover the binary data. For modem signals transmitted over the public telephone system, the analog waveforms are treated by central office facilities in the same manner as if the waveforms were analog voice signals. In other words, the waveforms are digitized into eight bit octets by an analog to digital converter (ADC) codec at the central office, and the octets are transmitted in digital format between central offices until they are converted back to an analog signal by a digital to analog converter (DAC) codec at the central office that is connected to the receiving subscriber loop. The public switched telephone network has operated in this manner for many years.

The data rate attainable by a modem operating in such an environment is limited by numerous factors including, in particular, the codec sample rate and the number and spacing of quantization levels of the codec converters at the central office switches. The effect on an analog signal associated with sampling the signal amplitude and representing the sample by one of a finite number of discrete (digital) values is generally referred to as quantization noise. Most telephone switches utilize voice codecs that perform nonlinear A/D and D/A conversions known as $\mu$-law or A-law conversion. In these conver sion formats, the 8-bit codec codewords, also referred to as octets, represent analog voltages that are nonlinearly spaced. This type of conversion performs well for voice signals intended for a human listener (especially when transmitted over a noisy line), but have a negative impact on modulated analog waveforms associated with modems. Specifically, codecs that adhere to these standard nonlinear conversion formats use nonlinearly spaced quantization levels, and have the effect of increasing quantization noise which is detrimental to modulated analog waveforms.

Until recently, it was thought that t he maximum attainable data rate for signals passing through the DTN was limited by the quantization noise associated with the codecs. However, it has been recognized that a data distribution system can overcome certain aspects of the aforesaid limitations by providing a digital data source connected directly to the DTN, without any intervening ADC or DAC. In such a system, the telephone network routes digital signals from the data source to the client's local subscriber loop without any intermediary analog facilities, such that the only analog portion of the link from server to client is the client's local loop (plus the associated analog electronics at both ends of the loop). The only DAC in the transmission path is the one at the Telephone Company's end of the client's subscriber loop. In such a system digital data can be converted into PCM codes, and fed to the DTN as 8-bit bytes (octets) at the network's clock rate of 8 kHz. At the distant end, the DTN's DAC converts each byte to one of 255 analog voltage levels, which is sent over the client's subscriber loop and received by a subscriber device (i.e., a modem) at the client's location.

FIG. 1 shows a block diagram of a data distribution system. The system includes a data source 10, or server, having a direct digital connection 30 to a digital telephone network (DTN) 20. A client 40 is connected to the DTN 30 by a subscriber loop 50 that is typically a two-wire, or twisted-pair, cable. The DTN routes digital signals from the data source 10 to the client's local subscriber loop without any intermediary analog facilities such that the only analog portion of the link from the server to the client is the client's local loop 50. The analog portion thus includes the channel characteristics of the local loop transmission line plus the associated analog electronics at both ends of the line. This typically includes a subscriber line interface card at the central office that includes a codec, as well as circuitry used to generate and interpret call progress signals (ring voltage, on-hook and off-hook detection, etc.). The only D/A converter in the transmission path from the server to the client is the one at the DTN end of the client's subscriber loop. It is understood that the client-side, or subscriber-side, equipment may incorporate an A/D and D/A for its internal signal processing, as is typical of present day modem devices. For the reverse channel, the only A/D converter in the path from the client to the server is also at the Telephone Company's end of the client's subscriber loop.

FIG. 2 shows a typical communication system presently used for data communication. The basic elements of the subscriber loop connection are a modem 62 that is connected by an analog line 64 to a local switch 66, which terminates the switched digital telephone network 60. The modem 62 is typically located at the subscriber's premises and includes a receiver 68 and transmitter 70. As shown in FIG. 2 the receiver 68 and the transmitter 70 are coupled to the analog line 64 by a hybrid 72. The transmitter 70 converts input digital data 74 into analog signals that are passed through the hybrid 72 and transmitted over the analog line 64 to the local switch 66. Likewise, the receiver 68 converts input analog signals, which pass from the analog line 64 through the hybrid 72, into digital data 76.

At the local switch 66 end of the subscriber loop, analog signals from the line 64 are directed through a hybrid 78 to an analog-to-digital converter 80. The analog-to-digital converter 80 samples the analog signals converting them into a digital data stream for transmission through the switched digital telephone network 60. For transmission in the opposite direction, a digital data stream is applied from the digital telephone network 60 to a digital-to-analog converter 82. The digital-to-analog converter 82 converts the data stream into analog signals that are passed through to the hybrid 78 to the analog line 64, for transmission to the appropriate subscriber. Preferably, the hybrids 72 and 78 are used to interface the transmit and receive signals into a two-wire circuit for transmission over a single twisted pair. In the event that a four-wire circuit is used, having a dedicated two-wire connection for transmission in each direction, hybrids 72 and 78 are unnecessary.

In the system shown in FIG. 1, digital data can be input to the DTN as 8-bit bytes (octets) at the DTN's clock rate of 8 kHz. This is commonly referred to as a DS-0 signal format. At the DTN's interface to the subscriber loop, the DTN's codec converts each byte to one of 255 analog voltage levels (two different octets each represent 0 volts) that are sent over the client's subscriber loop and received by a decoder at the client's location. As shown in FIG. 3, the analog voltages, or points, corresponding to the quantization levels are non-uniformly spaced and follow a generally logarithmic curve. As can be seen in FIG. 3, the increment in the analog voltage levels produced from one codeword to the next is not linear, but depends on the mapping as shown. Note that the vertical scale of FIG. 3 is calibrated in integers from 0 to 32,124. These numbers correspond to a linear 16-bit A/D converter. As is known to those of ordinary skill in the art, the sixteenth bit is a sign bit which provides integers from 0 to −32124 which correspond to octets from 0 to 127, not shown in FIG. 3. Thus FIG. 3 can be viewed as a conversion between the logarithmic binary data and the corresponding linear 16-bit binary data. It can also be seen in FIG. 3 that the logarithmic function of the standard conversion format is approximated by a series of 8 linear segments.

The conversion from octet to analog voltage is well known, and is based on a system called $\mu$-law coding in North America (and A-law coding in Europe). Theoretically, there are 256 points represented by the 256 possible octets, or $\mu$-law codewords. The format of the $\mu$-law codewords is shown in FIG. 4, where the most significant bit $b_7$ indicates the sign, the three bits $b_6$–$b_4$ represent the linear segment, and the four bits, $b_0$–$b_3$ indicate the step along the particular linear segment. These points are symmetric about zero; i.e., there are 128 positive and 128 negative levels, including two encodings of zero. Since there are 254 points not including zero, the maximum number of bits that can be sent per signaling interval (symbol) is just under 8 bits. Other factors, such as noise, digital attenuation (pads), channel distortion introduced by the subscriber loop, and the crowding of points at the smaller voltage amplitudes and the associated difficulty in distinguishing between them at the decoder/receiver, may reduce the maximum attainable bit rate.

Certain network connections utilize a supervisory signaling technique called Robbed Bit Signaling (RBS). On RBS links, the least significant bit (LSB) of the PCM code is usurped, or "robbed", by the network periodically and used to convey control information. The PCM codes from different channels are grouped together and multiplexed into frames, typically 24 DS-0 channels plus a framing bit, to create a DS-1 signal that may be sent over a T-1 carrier system. In typical robbed bit signaling, the T-1 carrier system uses the LSB of every channel, every sixth frame, for sending control and status information between network equipment. Thus, each DS-0 user loses the use of the LSB every sixth octet (once per every sixth DS-1 frame). Ordinarily, these channels are used for voice communications, and the bit robbing merely increases quantization noise of the effected time slots. The effect of robbed bit signaling on voice quality is barely perceptible to the human ear.

Usually the robbed bit is replaced by a logical '1' at the DAC before transmission to the subscriber, but some DACs output a level halfway between logical '1' and logical '0', which we refer to as logical '1/2'. There are also networks that substitute a logical '0' for the robbed bit before passing it to the subscriber loop. In short, there are three possible ways that codecs interpret robbed-bit signaling: one where the LSB is always viewed as a logical '1'; one where the LSB is viewed as a logical '0'; and one where the analog output level is midway between the two analog levels that would otherwise be produced.

In addition, due to the fact that a DS-0 channel might traverse several digital networks before arriving at the network DAC at the remote location, more than one PCM code word per 6 time slots could have a bit robbed by each network, with each network setting the LSB to '1' or '0' before passing it on to another network. Thus bit robbing may be of different phases because the network links are not frame synchronized. It should be noted that only a DAC can produce the '1/2' type robbed bit. Timing signals sent to the DAC are used to indicate what slot is bit-robbed. Therefore, only one RBS interval of type '1/2' can exist per 6 time slots. So in general, every 6 time slots may contain 0,1, . . . , 6 robbed bit intervals of type '1' or '0', but only one of the 6 can be of type '1/2'.

To control power levels, some networks impose digital attenuators. Unlike analog attenuators, a network digital attenuator (NDA) is not linear. Because there are a finite number of digital levels to choose from, the NDA will be unable to divide each codeword in half. This causes distortion of the analog level ultimately transmitted by the DAC over the subscriber loop. For example, if the NDA is designed to reduce voltage levels by ½ (6 dB), then PCM code 130 will attenuate to code 146, and the corresponding analog levels will not be related exactly by a factor of ½. Also, NDAs can produce code ambiguities, which happens more frequently with codes corresponding to small absolute linear values. Specifically, more than one codeword may be reduced to the same attenuated codeword, resulting in an ambiguity.

RBS and an NDA can coexist in many combinations. For example, a PCM interval could have a robbed bit of type '1', followed by an NDA followed by another robbed bit of type '1'. This could happen to a byte if a channel goes through a bit-robbed link, then through an NDA, then another bit-robbed link before the network DAC.

The above described data transmission system will in general suffer an unacceptable level of data errors on RBS/NDA circuits unless a coding method is devised that does not depend on the bits that are robbed/attenuated by the network. This coding technique will be most efficient if the LSB's of the PCM codes can be utilized during all symbol intervals except the ones that are subject to RBS. This efficiency can only be obtained if the modem receiver determines the presence of RBS, the phase(s) of the RBS time slots relative to the transmitter's frame reference, and communicates this information to the transmitter during the start-up phase of the communications session.

In addition, detecting the presence of a network digital attenuator can further allow for a more judicious choice of PCM codes to minimize the impact of distortion and code ambiguities. It is also desirable to train and maintain a DFE during RBS/NDA to minimize training-time noise performance penalties, which requires accurate "hard" decisions.

SUMMARY OF THE INVENTION

Disclosed herein is a method of detecting the presence of signal impairments that introduce distortion in one or more time slots of a communication link. The technique of determining the type of network impairments disclosed herein applies to the above described communications system, where the server-transmitter sends a training sequence through the DTN for the purpose of training the client modem's receiver prior to data transmission. The DTN imparts an unwanted distortion (RBS/NDA). The method detects the impairments by comparing a received training sequence of signal points with hypothetical received signal points, where the hypothetical points are predistorted versions of the training sequence. The receiver has knowledge of the training sequence, and forms the hypotheses based on the known, predetermined training sequence of signal points. A detection matrix is formed where one dimension of the matrix corresponds to a time slot within a frame, preferably six time slots to a frame, and the other dimension corresponds to a particular impairment, or combination of impairments. The individual signal impairments are generally one or more of the following: robbed bit signaling where the robbed bit is replaced with a logic '0'; robbed bit signaling where the robbed bit is replaced with a logic '1'; robbed bit signaling where the robbed bit is replaced with a logic '1/2'; 3 dB digital attenuator; 6 dB digital attenuator. The hypotheses are based on individual impairments and combinations/permutations of these impairments. The minimum value of each column (corresponding to a time slot within the frame) of the detection matrix indicates the type of impairment in that time slot.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
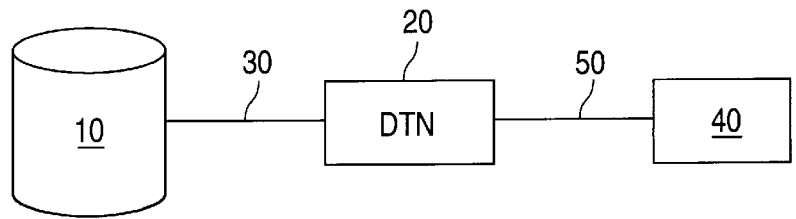
FIG. 1 depicts a communications network with a data source having direct digital access to the DTN.
Figure 4:
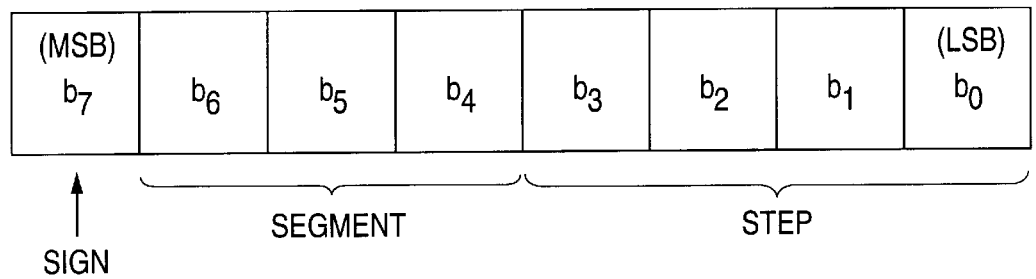
FIG. 4 shows the elements of a $\mu$-law codeword.

The detection procedure is employed during an N point training sequence, referred to herein as sequence Dsr, transmitted by the server 10. In the system of FIG. 1, the server 10, having direct digital access to the DTN may be a single computer, or may include a communications hub that provides digital access to a number of computers or processing units. Such a hub/server is disclosed in U.S. Pat. No. 5,528,595, issued Jun. 18, 1996, and is incorporated herein by reference. Another hub/server configuration is disclosed in U.S. Pat. No. 5,577,105, issued Nov. 19, 1996, which is also incorporated herein by reference.

In order to minimize DC frequency components, the N points are composed of N/2 positive points and N/2 corresponding negative points. In particular, each of the N/2 points and their negatives are sent once during a code interval and are sent according to a cyclic rotation pattern. For example, suppose N=6. Then, the pattern would look like:

| C1  | -C2 | C3  | -C3 | C2  | -C1 |
| --- | --- | --- | --- | --- | --- |
| -C2 | C3  | -C3 | C2  | -C1 | C1  |
| C3  | -C3 | C2  | -C1 | C1  | -C2 |
| -C3 | C2  | -C1 | C1  | -C2 | C3  |
| C2  | -C1 | C1  | -C2 | C3  | -C3 |
| -C1 | C1  | -C2 | C3  | -C3 | C2  | where the $C_i$, i=1,2,3, are PCM codewords, and each row corresponds to a frame, and each column corresponds to a time slot within successive frames. Alternatively, the following sequence or others may also be used, however, the above sequence demonstrates preferred (more evenly distributed) spectral density properties:

| C1  | C2  | C3  | -C3 | -C2 | -C1 |
| --- | --- | --- | --- | --- | --- |
| C2  | C3  | -C3 | -C2 | -C1 | C1  |
| C3  | -C3 | -C2 | -C1 | C1  | C2  |
| -C3 | -C2 | -C1 | C1  | C2  | C3  |
| -C2 | -C1 | C1  | C2  | C3  | -C3 |
| -C1 | C1  | C2  | C3  | -C3 | -C2 |

The above examples each represent one block of a multi-block training sequence.

In the preferred embodiment it is desired to detect the following 14 Network impairments in each time slot interval:

| Impairment Type Number | Impairment Type | Impairment Type Abbreviation |
| --- | --- | --- |
| 0 | No RBS, No NDA | r~p~r~ |
| 1 | RBS = '1' | r~p~r |
| 2 | RBS = '1/2' | r~p~r1/2 |
| 3 | 6 dB NDA Only | r~pr~ |
| 4 | 6 dB NDA, followed by RBS = '1' | r~pr |
| 5 | RBS = '1', followed by 6 dB NDA | rpr~ |
| 6 | RBS = '1', followed by 6 dB NDA, followed by RBS = '1' | rpr |
| 7 | 6 dB NDA, followed by RBS = '1/2' | r~pr1/2 |
| 8 | RBS = '1', followed by 6 dB NDA, followed by RBS = '1/2' | rpr1/2 |
| 9 | 3 dB NDA Only | r~p3r~ |
| 10 | 3 dB NDA, followed by RBS = '1' | r~p3r |
| 11 | RBS = '1', followed by 3 dB NDA | rp3r~ |
| 12 | RBS = '1', followed by 3 dB NDA, followed by RBS = '1' | rp3r |
| 13 | 3 dB NDA, followed by RBS = '1/2' | r~p3r1/2 |
| 14 | RBS = '1', followed by 3 dB NDA, followed by RBS = '1/2' | rp3r1/2 |

There are many other combinations and permutations of network impairments beyond the specific example above. The different combinations and permutations may include the other types of robbed bit signaling, or other types of digital attenuators. Specifically, RBS of type '0' may be detected in alternative embodiments.

At the receiver, the following distance/detection matrix is formed:

$$m_{i,j} = \sum_{k=0}^{L-1} |V_{i,j} - R_{j,k}|, \quad i = 0, \ldots, 8; \quad j = 0, \ldots, 5$$

where $m_{i,j}$ is the i,j element of the 9×6 distance/detection matrix, M, with i being the hypothesis (impairment) index and j the PCM code interval index (time slot) within a 6 PCM interval frame, and the symbol |v| indicates the $R^2$ norm of vector v (the square root of the sum of the squares of the vector elements). The index k designates the particular block (of L blocks) of cyclic codewords that are sent over the channel. $V_{i,j}$ is the hypothesis vector of size N (six elements for the case where N=6) for the ith impairment and jth time slot (it does not vary with k), and $R_{j,k}$ is the vector representing the received points in the jth time slot of block k. That is, the elements of $R_{j,k}$ are the actual received voltage values (expressed in digital, linear format).

The $V_{i,j}$ consist of six elements formed by the pre-calculated linear values obtained when C1, C2, and C3 and their opposites (in the appropriate sequence for the given value of j) are sent through a given (hypothetical) network impairment. The specific sequence of the elements of $V_{i,j}$ is dependent upon the time slot j. Hence, after one block (thirty-six time slots or six frames of six time slots), one has received 6 vectors ($R_{0,0}, R_{1,0}, \ldots, R_{5,0}$), which are used with the 14 hypothesis vectors ($V_{0,0}, V_{1,0}, \ldots, V_{14,0}$), the form the 14×6 "partial" elements of M (one partial matrix is formed for each value of k). This process is repeated L times to form the final distance/detection matrix (i.e., the sum over k is computed).

One can determine the type of impairment that exists in each code interval by inspecting the final distance/detection matrix:

| |—————PCM Code Interval—————| | | | |
|---|---|---|---|---|---|
| 0 | 1 | 2 | 3 | 4 | 5 |
| $m_{0,0}$ | | | | | $m_{0,5}$ |
| | | | | | |
| | | | | | |
| | | | | | |
| | | $m_{i,j}$ | | | |
| | | | | | |
| | | | | | |
| | | | | | |
| $m_{14,0}$ | | | | | $m_{14,5}$ |

For each code interval (column) the minimum element corresponds to the type of network impairment detected (type number 0, 1, . . . , 14).

Figure 5:
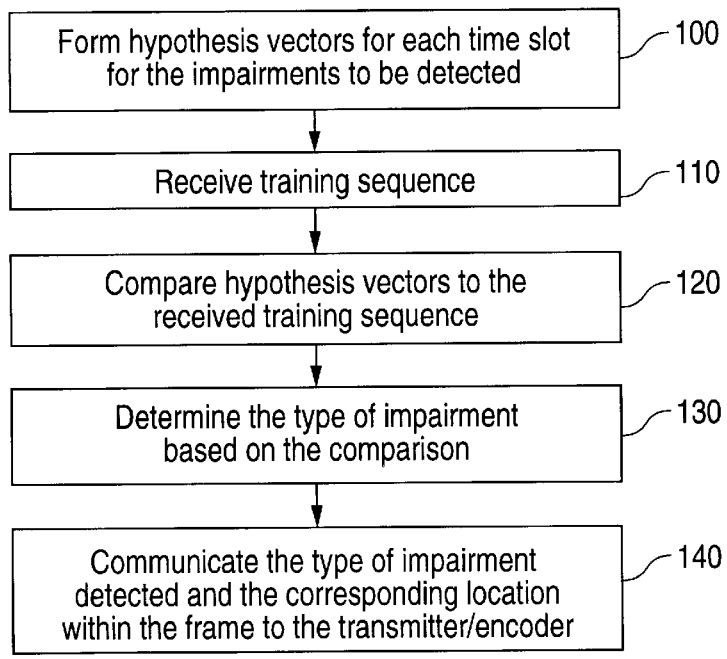
FIG. 5 shows a flow chart for the impairment detection procedure.
Figure 2:
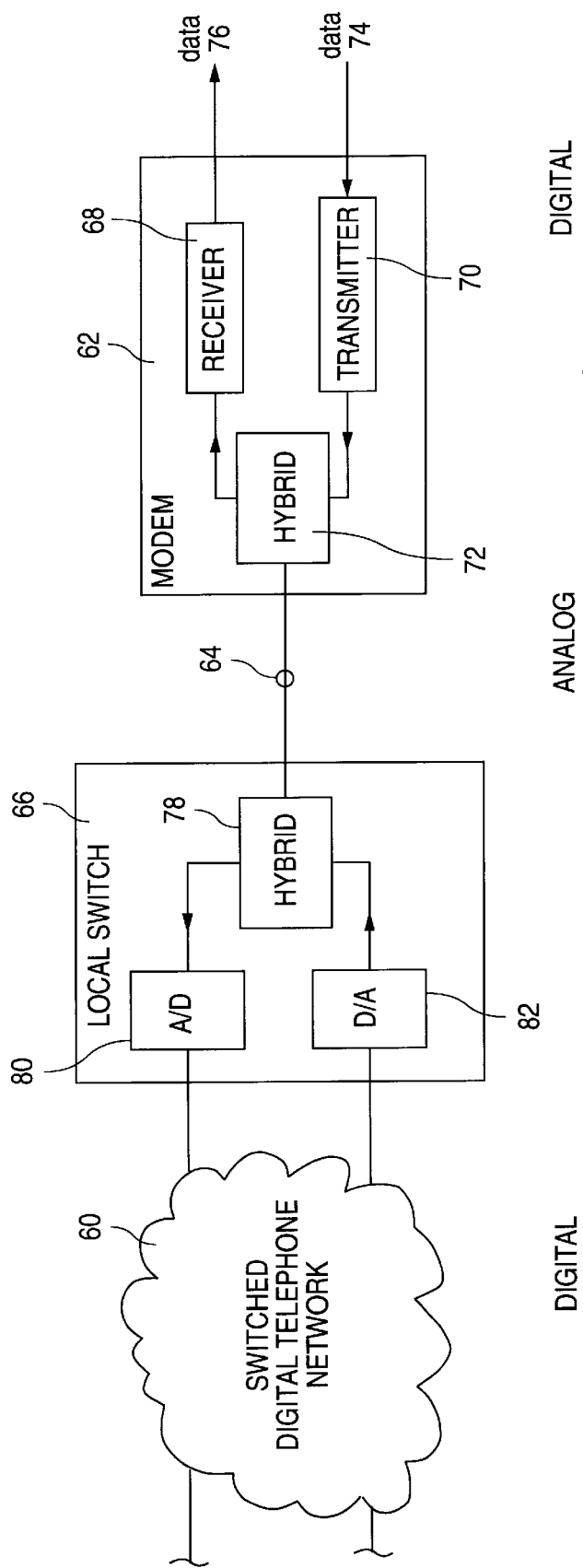
FIG. 2 shows a prior art communications system.
Figure 3:
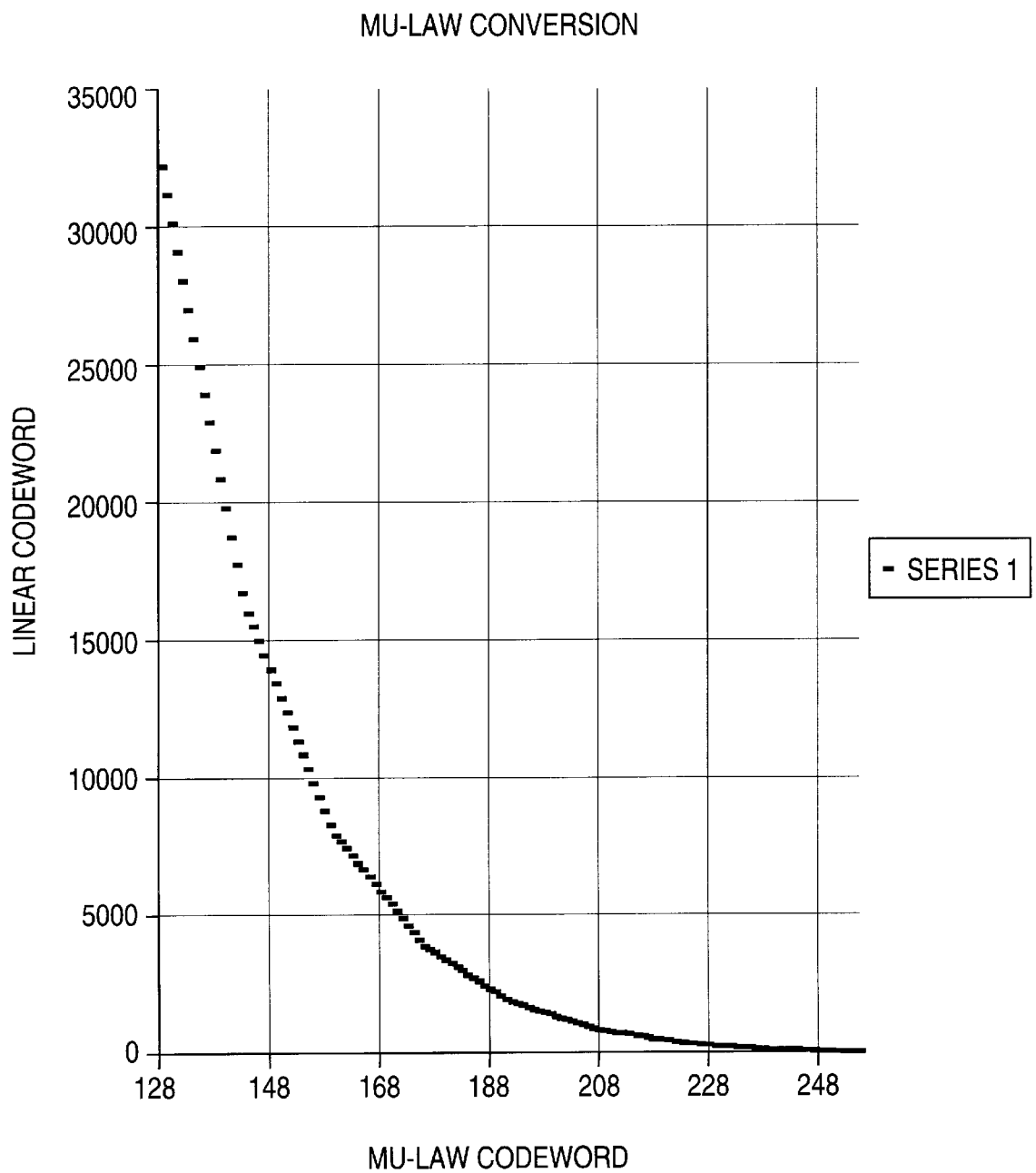
FIG. 3 shows a $\mu$-law to linear conversion graph.

FIG. 5 depicts the method of detecting the impairments. At step 100, the hypotheses are formed for each time slot based on the impairments to be detected. The hypotheses may be in vector form, where the elements correspond to predistorted versions of the known, predetermined training sequence. At step 110, the training sequence is received. The received training sequence may have been distorted by network impairments. At step 120, a comparison is made between the hypotheses and the (possibly distorted) received training sequence. In particular, the received points in a given time slot are compared to the predistorted points (corresponding to that time slot) formed at step 100. A metric is formed by determining the "distance" between the received points and each hypothesis. The distance is calculated by taking the sum of the squares of the difference between each received point and its corresponding predistorted point. Optionally, the square root may then be calculated. At step 130, the type of impairment is determined based on the comparison done at step 120. In the preferred embodiment, the determination is made by examining the elements in each column of a matrix, where the elements of each column correspond to the metric formed for one time slot and for all impairments to be detected. Finally, at step 140, the receiver communicates the type of impairment detected and its corresponding time slot within the frame to the transmitter/encoder. The information may returned explicitly to the server/transmitter, or implicitly in the form of a message sent from the receiver that, e.g., informs the transmitter of the constellation points to use in each time slot.

To determine the best six point Dsr to transmit, an optimizer was written (in C code), which under average power constraints, produces three PCM codes forming a PCM code vector, C*, which when converted to linear and transmitted through each hypothesized network impairment, maximizes the minimum metric, which is the difference. It is important that the sequence enables the receiver to distinguish between the various network impairments. Therefore, the code vector used to determine the nature of the network impairments is one that provides sufficiently distinct resulting vectors when passed through each of the various impairments. The greater the difference in the received vectors, the better the receiver is able to determine the type of impairments present on the line. This may be expressed as a maxi-min criterion as follows:

C*=C, which satisfies: $\max[\min|R_i-R_j|]$, C∈S, i,j=0,1, . . . , 8 i≠j where $R_i$ (or $R_j$) is the received vector of three linear elements formed when PCM code vector C=(C1,C2,C3) chosen from the power constrained set of code vectors,S, consisting of three elements C1, C2, and C3 (three eight-bit PCM codewords), is transmitted through network impairment i (or j). The optimized codewords obtained are as follows:

C1=158, C2=161, C3=168, −C1=30, −C2=33, and −C3=40.

The optimizer can easily be extended to handle more hypotheses to detect other impairments or combinations of impairments. The method gives a very robust indication that RBS/NDA is present, and also which interval(s) in the six symbol frame are effected, as well of the type of RBS, if present. Experiments have been performed in simulations and real networks, which show that L can be as small as 8 (i.e., 8*6*6=288 symbol/code times), which is rather efficient in terms of detect time.

The client modem transmits the detection information back to the server during a subsequent information exchange. The data encoder/mapper can use a special encoding and mapping technique to mitigate the network impairments with the minimum loss of data throughput. For example, in order to provide flexible data rates, a modulus converter may be used to provide a method of sending a fractional number of bits per symbol, so as to achieve a maximum data rate at a minimum required SNR. In addition, it is desirable to mitigate the effects of RBS, such that the highest possible data rate is achieved. Both these requirements can be met with modulus conversion. The modulus conversion encoding technique employed by the transmitter is described in U.S. Provisional Application Ser. No. 60/030, 843, filed Oct. 15, 1996, entitled "Efficient Data Transmission Over Digital Telephone Networks using Multiple Modulus Conversion", the contents of which are incorporated herein by reference. Alternatively, multiple modulus shell mapping may be used, as described in U.S. patent application Ser. No. 08/888,201, filed Jul. 7, 1997, the contents of which are incorporated herein by reference.

During RBS/NDA detection, the receiver's equalizer is not updated. However, after detection, further training can be performed, using a priori knowledge of the network impairments, thus reducing training time and accuracy. This a priori knowledge can also be applied to adaptive equalization and the data decision process during data mode transmission.

After the RBS/NDA detection phase, the receiver has knowledge of the network impairments, including the code phases for each type of impairment. This knowledge is used to determine the proper decisions for the equalizer (as well as the correct data decisions). During each code interval, the decision device bases its decisions for the DFE and the data decision process on the network impairment occurring in an interval, based on knowledge of the transmitter sending points through the particular network impairment. During non-RBS intervals, data decisions and decisions for the equalizer are the same. Note that during RBS, "RBS" decisions for the DFE and data decisions will sometimes be the same. (For example, if the received point into the decision device is closer to a '1' point, even though the RBS type is '1/2', both decisions will be the same).

Figure 6:
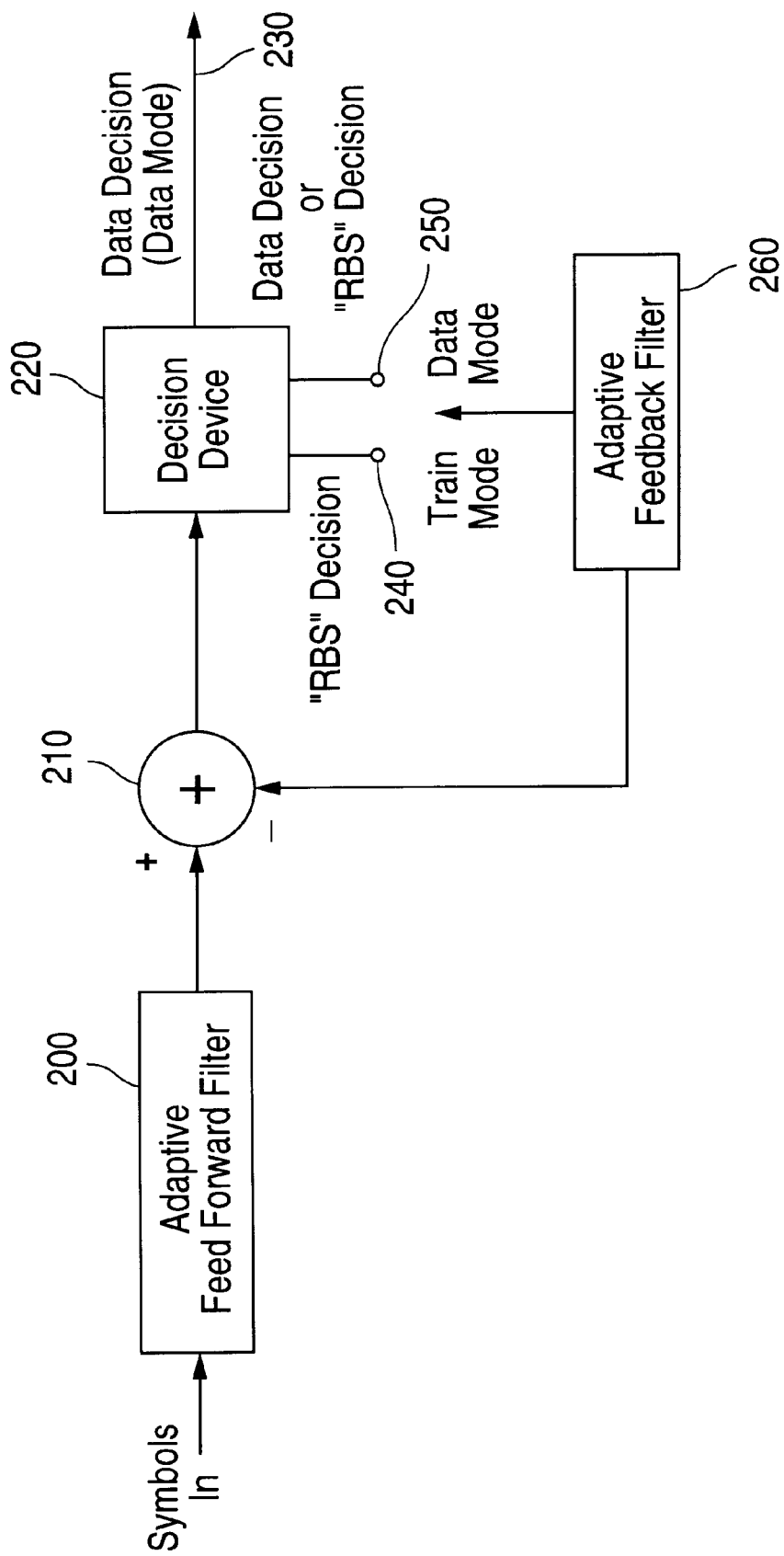
FIG. 6 shows the structure of DFE decision process.

FIG. 6 shows the structure of the DFE. The adaptive feed forward portion 200 filters the input symbols, and the output is fed to the summer 210. The output of the summer 210 is input to the decision device 220. The decision device provides data decisions on output 230. Additionally, the decision device provides outputs 240 and 250 to the feedback portion 260 of the equalizer.

A preferred embodiment of the present invention has been described herein. It is to be understood, of course, that changes and modifications may be made in the embodiment without departing from the true scope of the present invention, as defined by the appended claims.

We claim:

1. A method of detecting the presence of signal impairments that introduce distortion in one or more time slots of a communication link comprising the steps of:

receiving from the communication link a predetermined training sequence of signal points having a duration of at least one frame, each signal point comprising a sequence of bits, and said at least one frame comprises a plurality of time slots, and said sequence of bits of said received training sequence is distorted by the presence of the signal impairments in the communication link, whereby the distortion alters said sequence of bits;

forming at least one impairment hypothesis for each of said plurality of time slots at a receiver, said at least one hypothesis being formed by altering bits of said predetermined training sequence to simulate one of a plurality of signal impairments to be detected;

comparing said received training sequence of signal points with said at least one hypotheses; and, detecting the presence of signal impairments in each of said plurality of time slots in response to said comparison.

2. The method of claim 1 wherein said frame has duration of six said time slots.

3. The method of claim 1 wherein said forming step comprises the step of predistorting said predetermined training sequence in relation to a hypothetical signal impairment.

4. The method of claim 3 wherein said formed hypothesis is a vector whose elements correspond to one said time slot, and said elements are formed in said predistoring step.

5. The method of claim 1 wherein said comparing step comprises calculating the difference between one signal point of said received sequence of signal points and said hypothesis for each said time slot.

6. The method of claim 1 wherein the detecting step comprises identifying said signal impairments as being one or more of a plurality of known impairments.

7. The method of claim 6 wherein the signal impairments comprise at least one of: robbed bit signaling where the robbed bit is replaced with a logic '0'; robbed bit signaling where the robbed bit is replaced with a logic '1'; robbed bit signaling where the robbed bit is replaced with a logic '1/2'; 3 dB digital attenuator; 6 dB digital attenuator.

8. The method of claim 1 wherein the comparing step further comprises the step of forming a two-dimensional matrix, where the first dimension of said matrix defines columns, said columns corresponding in number to the number of said plurality of time slots, and the second dimension of said matrix defines rows, said rows corresponding in number to the number of said impairment hypotheses, and the matrix elements are formed in response to said received training sequence of signal points.

9. The method of claim 8 wherein the detecting step comprises locating a minimum-valued element in each said column, determining a row index of said minimum valued element, and identifying the signal impairment associated with said row index.

10. The method of claim 1 further comprising the step of communicating the type of impairment detected and its corresponding time slot to a transmitter.

* * * * *